United States Patent [19]

Prosnitz et al.

[11] Patent Number: 4,506,229
[45] Date of Patent: Mar. 19, 1985

[54] FREE ELECTRON LASER DESIGNS FOR LASER AMPLIFICATION

[75] Inventors: Donald Prosnitz, Walnut Creek; Abraham Szöke, Fremont, both of Calif.

[73] Assignee: The United States of America as represented by the United States Department of Energy, Washington, D.C.

[21] Appl. No.: 342,679

[22] Filed: Jan. 26, 1982

[51] Int. Cl.³ .............................................. H01S 3/09
[52] U.S. Cl. ........................................ 330/4.3; 372/2; 315/3.5
[58] Field of Search ............... 330/4.3; 372/2, 69, 372/92; 315/3.5

[56] References Cited

U.S. PATENT DOCUMENTS

| | | | |
|---|---|---|---|
| 4,162,432 | 7/1979 | Schlett | 372/74 |
| 4,287,488 | 9/1981 | Brau et al. | 372/2 |
| 4,323,857 | 4/1982 | Brau et al. | 372/69 |
| 4,331,936 | 5/1982 | Schlesinger et al. | 372/2 |
| 4,337,413 | 6/1982 | Pantviorme | 315/3.5 |
| 4,345,329 | 8/1982 | Daucet et al. | 372/2 |
| 4,425,649 | 1/1984 | Elies et al. | 372/2 |

OTHER PUBLICATIONS

Boelmer et al., "An Experiment on FEL ... Wiggler", 6/81, pp. 3156–3159, IEEE Trans. on Nuc. Sci., vol. NS-28, #3.

*Primary Examiner*—Nelson Moskowitz
*Attorney, Agent, or Firm*—John S. Schipper; Patrick T. King; Michael F. Esposito

[57] ABSTRACT

Method for laser beam amplification by means of free electron laser techniques. With wiggler magnetic field strength $B_w$ and wavelength $\lambda_w = 2\pi/k_w$ regarded as variable parameters, the method(s) impose conditions such as substantial constancy of $B_w/k_w$ or $k_w$ or $B_w$ and $k_w$ (alternating), coupled with a choice of either constant resonant phase angle or programmed phase space "bucket" area.

6 Claims, 12 Drawing Figures

FREE ELECTRON LASER DESIGNS FOR LASER AMPLIFICATION

BACKGROUND OF THE INVENTION

The U.S. Government has rights in this invention pursuant to Contract W-7045-ENG-48 between the U.S. Department of Energy and the University of California Lawrence Livermore National Laboratory.

The possibility of generating partially coherent electromagnetic radiation by collinear passage of the radiation and of a relativistic electron beam through a sequence of electric or magnetic fields of alternating polarity, has been recognized since the first publication by H. Motz, Journal of Applied Physics 22 527 (1950) on the subject. Motz considered a sequence of alternating direction magnetic fields, regularly spaced and transversely oriented relative to the common direction of travel of light beam and electron beam. Let $L_o$ be the fundamental period of variation of direction of the sequence of transverse magnetic fields and let the beam electrons move with velocity $v \simeq c$. The light beam photons will be absorbed and re-emitted by the elctrons, and the frequency $\nu$ of emitted radiation will depend upon angle of observation $\theta$ relative to the common beam direction according to $\nu = v/L_o (1 - \cos\theta)$. For a highly relativistic electron beam and modest transverse magnetic field strengths, most of the radiation appears in the forward direction, in a narrow cone of half angle of the order of $\Delta\theta = m_e c^2/E_b$ where $$E_b = m_e c^2 / \left[1 - \frac{v^2}{c^2}\right]^{\frac{1}{2}}$$

is the electron total energy.

Motz, Thon and Whitehurst, in Jour. of Appl. Phys. 24 826 (1953), further considered the co-propagating light beam and electron beam in a waveguide, obtained some interesting general classical relativistic relationships for electron orbits in a spatially varying B-field, and reported the experimental observation of visible and millimeter wavelength radiation for field strengths $B \approx 3,900$ and 5,600 Gauss.

In *Proceedings of the Symposium on Millimeter Waves* (Polytechnic Press, Brooklyn, 1960) p. 155, Motz and Nakamura analyzed the amplification of a millimeter wavelength electromagnetic wave interacting with a relativistic electron beam in the presence of a rectangular waveguide and a spatially oscillatory electric field, using a model of J. R. Pierce. The analysis was purely classical, and the gain was rather modest.

Pantell, Soncini and Puthoff discuss some initial considerations on stimulated photon-electron scattering I.E.E.E. Journal of Quantum Electronics QE-4 905 (1968). Collinear scattering, with the incident photon energy $h\nu$ being $<<$ incident electron energy $E_{el}$ and periodic deflection of the electron beam by a microwave radiation field, is analyzed briefly; and a Compton scattering laser is proposed, using the input/output wavelength relation $$\nu_{out} = 4\left(\frac{E_{el}}{m_e c^2}\right)^2 \nu_{in}.$$

Useful gain from the device appears to be limited to the middle-high infrared range $\lambda \geqslant 20 \,\mu m$.

Mourier, in U.S. Pat. No. 3,879,679, discloses a Compton effect laser that proceeds from the same principles as Pantell et al., supra. This invention, like that of Pantell et al., appears to require provision of an electron storage ring or the like for rapidly moving electrons and an optical cavity that is a part of the ring, for causing electron-photon scattering.

R. M. Phillips, in I.R.E. Transactions on Electron Devices, 231 (October 1960), used a periodic magnetic field, whose period may vary, to focus and axially bunch an electron beam traveling in an unloaded waveguide, together with a monochromatic light beam, to increase electron beam kinetic energy at the expense of light beam energy. The electron beam velocity was adjusted so that a beam electron travels one period L along its trajectory in the time required for the light beam (of wavelength $\lambda$) to travel a distance $L + \lambda$. The electron then senses only the retarding portion or only the accelerating portion of the electromagnetic wave. This approach converts transverse momentum, arising from the presence of the electromagnetic wave, into changes in axial momentum of the electron beam so that beam bunching occurs. Peak efficiency was about 10 percent for the experiments reported.

J. M. J. Madey, in Journal of Applied Physics 42 1906 (1971), discusses stimulated emission or bremsstrahlung by a relativistic electron into a single electromagnetic mode of a parallel light beam, where both electron and light beam move through a periodic, transverse d.c. magnetic field. Quantum mechanical and semi-classical calculations of transition rates and gain indicate that finite, practical gain is available in the infrared and visible portions of the optical spectrum. These considerations are incorporated in U.S. Pat. Nos. 3,822,410, issued to Madey for tunable apparatus for generation/amplification of coherent radiation in a single or a few closely spaced electromagnetic modes.

Hirshfield, in U.S. Pat. No. 3,398,376 for a relativistic electron cyclotron maser, discloses and claims use of an axial, monoenergetic relativistic electron beam ($E_{kinetic} \sim 5$ keV) a spatially-varying longitudinal magnetic field coaxial with the beam, a weaker, transverse periodic electric or magnetic with a resulting helical pitch matching that of the electron motion at the predetermined beam velocity and a cavity resonator with a mode frequency matching that of the cyclotron frequency of the resulting spiraling electrons. The apparatus relies upon electron cyclotron radiation and ignores any synchronization of electron beam and the electromagnetic beam to be amplified.

A combination free electron laser/gas laser with high pulse repetition rates is taught by U.S. Pat. No. 4,189,686, issued to Brau, Rockwood and Stern. In the embodiment disclosed, the free electron laser operates at infrared wavelengths and the gas laser operates at ultraviolet wavelengths. The monoenergetic electron beam is initially bunched and accelerated to $\sim 10$ MeV kinetic energy and directed into and out of a multiplicity of serially arranged free electron lasers by turning magnets positioned at the ends of these lasers; finally, the electron beam is directed axially through a gas laser to utilize and convert additional electron beam energy to electromagnetic energy. The free electron laser appears to be of conventional form, utilizing fixed period magnetic fields to produce electron bremsstrahlung radiation and an optical resonator for light beam amplification.

SUMMARY OF THE INVENTION

An object of this invention is to provide a method for laser beam amplification by use of a relativistic electron beam and an external magnetic field.

Another object is to provide a tunable laser of high efficiency.

Additional objects, novel features and advantages thereof are set forth in the detailed description, with reference to the accompanying drawings, and may be realized by means of the instrumentalities and combinations pointed out in the appended claims.

The subject invention is a method for laser beam amplification by means of a free electron laser. To achieve the foregoing objects in accordance with the subject invention, as broadly described herein, the method in one embodiment may include the steps of providing a transversely directed temporally static wiggler magnetic field of spatially alternating polarity with predetermined magnetic field strength and wavelength; directing a collimated beam of electrons along a predetermined axis, with the electron beam power density being greater than the laser beam power density and with magnetic field variables chosen to satisfy one of three options; providing a substantially constant stable phase angle for the beam; and directing a beam of substantially monochromatic optical radiation of predetermined wavelength $\lambda_s$ along the predetermined axis in timed relationship with the passage of the electron beam.

A second embodiment of the method differs from the first embodiment only in that the condition of substantially constant stable phase angle is replaced by a requirement that the special rate of change of the electron beam phase space "bucket area" along the longitudinal axis, be substantially constant.

DETAILED DESCRIPTION

A free electron laser (FEL) is an ideal laser as it can be designed to operate at any frequency and is capable of high average power operation at high efficiency. Several workers in the field have pointed out that, by judiciously varying the parameters of the FEL system, the electrons used therein can be forced to lose energy continuously, thereby permitting the extraction by a co-propagating laser beam of a sizeable fraction of the electron beam's energy over the path of the electrons. The class of FELs, recently studied by Philip Morton, also included in Stanford Linear Accelerator Center Memo, 1979, unpublished, and incorporated in "Free Electron Lasers With Variable Parameter Wigglers", by N. M. Kroll, P. Morton, and M. N. Rosenbluth, JASON Tech. Report JSR-79-01, SRI International, February 1980, are essentially traveling wave linear accelerators (LINACs) operated in reverse. Electrons are held in a potential well or "bucket" as in a LINAC; but in contrast to the usual LINAC operation, the stable phase angle is chosen to decelerate the electrons and amplify the co-propagating light wave, with the FEL decelerating field being formed by a transverse, temporally static but longitudinally varying magnetic field and the amplified light signal field. The FEL studied by Morton could also be called a coherent electron decelerator; and Morton applied the standard techniques and notation of accelerator theory to the FEL problem. The analysis presented herein in support of various embodiments of the invention assumes that the light signal field and the electron current density are uniform in any plane transverse to the direction of propagation of the electron beam. Although operation of the amplifier is substantially the same when the laser beam and the electron beam are non-uniform in these planes, substantial benefits may be obtained by carefully tailoring both the transverse laser beam profile and the transverse electron beam profile.

Figure 1:
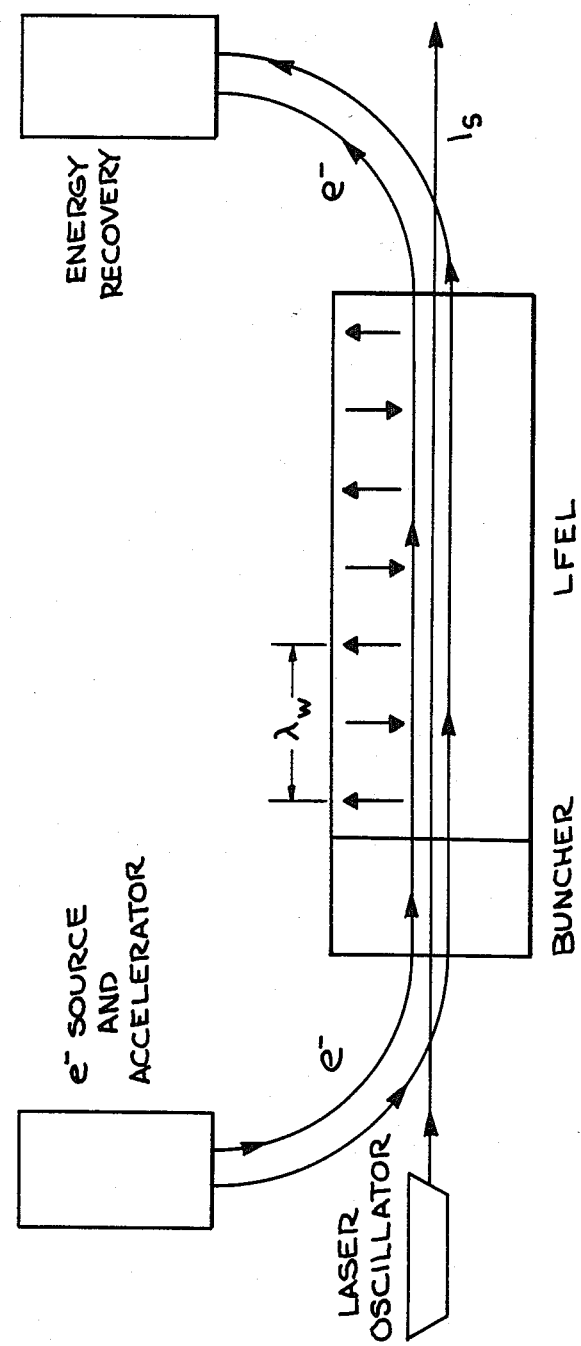
FIG. 1 is a schematic view of a free elctron laser useful with the subject invention.

An FEL is illustrated schematically in FIG. 1, with all parameters and variables as defined in Table 1. The electron beam is characterized by its current density, J, its average energy, $\gamma mc^2$ and its energy spread, $(\Delta \gamma) mc^2$. Electrons enter the FEL region with random phase relative to the electromagnetic wave. In the first section of the FEL, called the buncher, potential wells for the electrons are formed, with the electrons being bunched around the local potential minimum at a predetermined resonance phase angle, $\psi_r$.

TABLE I

| Definition of Symbols Used | |
|---|---|
| m | = electron rest mass |
| e | = electron charge |
| c | = speed of light in vacuum |
| $\gamma mc^2$ | = electron relativistic energy |
| $E_s$ | = electric field strength of laser radiation |
| $e_s$ | $= e E_s / \sqrt{2} \, mc^2$ |

TABLE I-continued
Definition of Symbols Used

| | |
|---|---|
| $\lambda_s$ | $= 2\pi/k_s = 2\pi c/\omega_s =$ wavelength of incident radiation |
| $B_w$ | $=$ strength of imposed "wiggler" magnetic field |
| $b_w$ | $= e\, B_w / \sqrt{2}\, mc\ (m^{-1})$ |
| $\lambda_w$ | $= 2\pi/k_w = 2\pi c/\omega_w =$ local wavelength of wiggler field |
| $\psi$ | $=$ phase angle of wave moving with the incident radiation; defined in Equation (5a) |
| J | $=$ electron beam current |
| $Z_o$ | $= 377$ ohms $=$ free space impedance |
| $\rho_o$ | $=$ electron beam charge density |
| z | $=$ longitudinal coordinate, measured along longitudinal axis of magnet |
| $f(\psi,\gamma)$ | $=$ phase space density function |
| $\langle g \rangle$ | $=$ phase space average of the function $g(\psi,\gamma)$, weighted by the phase space density function $f(\psi,\gamma)$; defined in Equations (5c,d) |
| $A_\Lambda$ | $=$ area of the "bucket" $= 2 \int_0^\psi \max\left[\dfrac{e_s b_w}{k_w^2}\right]^{\frac{1}{2}} [\cos\psi + \cos\psi_r - (\pi - \psi - \psi_r)\sin\psi_r]^{\frac{1}{2}}\, d\psi$ |
| $\phi$ | $=$ phase angle differential in definition of $\psi$. |
| $\omega_p$ | $=$ plasma frequency. |

The electron beam passes through the power amplifier section, where the parameters of the spatially periodic, temporally static magnetic field (wiggler field) are further varied to form decelerating buckets or wells that slow the electrons in a controllable way and, concomitantly, amplify the light signal field passing therethrough. Maintenance of the integrity of the electron bunches at the end of the power amplifier section will allow high efficiency operation of the FEL and may also allow a reacceleration of the electrons so that a substantial portion of the electron beam energy may be recovered in a recirculating LINAC or other direct energy converter.

The equations describing the operation of the FEL are easily derived and are given below. All symbols are defined in Table I.

$$\frac{d\gamma}{dz} = -\frac{e_s b_w}{k_w \gamma} \sin\psi \tag{1}$$

$$\frac{d\psi}{dz} = k_w - \frac{k_s}{2\gamma^2}\left[1 + \left(\frac{b_w}{k_w}\right)^2 - \frac{2e_s b_w}{k_w k_s}\cos\psi + \left(\frac{e_s}{k_s}\right)^2\right] + \frac{d\phi}{dz}, \tag{2}$$

$$\frac{de_s}{dz} = \frac{Z_0 b_w}{\sqrt{2k_w}}|J|\left\langle\frac{\sin\psi}{\gamma}\right\rangle, \tag{3}$$

$$\frac{d\phi}{dz} = \frac{Z_0 b_w}{\sqrt{2k_w}}\frac{|J|}{E_s}\left\langle\frac{\cos\psi}{\gamma}\right\rangle - \frac{k_s \omega_p^2}{2\gamma \omega_s^2} \tag{4}$$

where $$\Psi \equiv \int (k_s + k_w)\, dz - \omega_s t + \phi \tag{5a}$$

$$\left\langle\frac{\sin\psi}{\gamma}\right\rangle = \frac{\int [f(\psi,\gamma)/\gamma]\sin\psi\, d\psi\, d\gamma}{\int f(\psi,\gamma)\, d\psi\, d\gamma} \tag{5b}$$

and $$\left\langle\frac{\cos\psi}{\gamma}\right\rangle = \frac{\int [f(\psi,\gamma)/\gamma]\cos\psi\, d\psi\, d\gamma}{\int f(\psi,\gamma)\, d\psi\, d\gamma} \tag{5c}$$

$$\rho_0 = (-e/2\pi)\int d\psi \int f(\psi,\gamma)\, d\gamma \tag{5d}$$

In order to simplify FEL amplifier design we make the resonant electron approximation that allows us to replace that multi-variable functions (sin $\psi/\gamma$) and (cos $\psi/\gamma$) in Equations (3) and (4) with function of only two variables—the energy and phase of an "average electron". Other authors have shown that this is a good approximation for those electrons with energy $\gamma$ and phase $\psi$ that satisfy the condition $$|\gamma - \gamma_r| \leq P(\psi,\psi_r) = \tag{6}$$

$$\left(\frac{e_s b_w}{k_w^2}\right)^{\frac{1}{2}}[\cos\psi + \cos\psi_r - (\pi - \psi - \psi_r)\sin\psi_r]^{\frac{1}{2}},$$

where $\gamma_r$ and $\psi_r$ are the energy and phase of the average electron. Equation (6) was derived by choosing an average electron with the specific property that its energy varies in precisely the manner required to keep its phase nearly constant; that is, $$(d\psi_r/dz) << \Omega_{syn}, \tag{7}$$

where $$\Omega_{syn} = (2b_w e_s \cos\psi_r/\gamma_r^2)^{\frac{1}{2}}. \tag{8}$$

An electron with this property is usually called a resonant electron. Other electrons that satisfy Equation (6) will, on the average, track the motion of the resonant electron. Equation (6) defines a region in phase space $(\gamma,\psi)$ in which electron orbits are closed and stable, called a bucket by accelerator designers; and we designate with the label $\Lambda$ quantities associated with particles inside the bucket. We define A to be the area of the phase-space region delimited by Equation (6):

$$A_\Lambda(\psi_r) = 2\int P(\psi,\psi_r)\, d\psi. \tag{9}$$

This procedure permits us to simplify the system of Equations (1), (2), (3), and (4) to the following set of equations:

$$\frac{d\gamma_r}{dz} = -\frac{e_s b_w}{k_w \gamma_r}\sin\psi_r; \tag{10}$$

$$\frac{d\psi_r}{dz} = k_w - \frac{k_s}{2\gamma_r^2}\left[1 + \left(\frac{b_w}{k_w}\right)^2 - \frac{2e_s b_w}{k_w k_s}\cos\psi_r + \left(\frac{e_s}{k_s}\right)^2\right] + \frac{d\phi}{dz}; \tag{11}$$

$$\frac{de_s}{dz} = \frac{Z_0 b_w}{\sqrt{2k_w}} J_\Lambda \frac{\langle\sin\psi\rangle_\Lambda}{\gamma_r}, \tag{12}$$

$$\frac{d\phi}{dz} = \frac{Z_0 b_w}{\sqrt{2k_w}}\frac{J_\Lambda}{E_s}\frac{\langle\cos\psi\rangle_\Lambda}{\gamma_r}, \tag{13}$$

where $J_\Lambda$ is the current density within the bucket and $$<\sin\psi>_\Lambda = \frac{2}{A_\Lambda} \int P(\psi,\psi_r) \sin\psi d\psi, \quad (14a)$$

$$<\cos\psi>_\Lambda = \frac{2}{A_\Lambda} \int P(\psi,\psi_r) \cos\psi d\psi. \quad (14b)$$

Equations (9), (10), (11), (12) and (13) serve as the basis for the FEL designs.

A successfully designed FEL amplifier must continuously decelerate a large fraction of the electron beam. We base our designs on the assumption that this can be accomplished if the resonant particle is decelerated and simultaneously the bucket area is kept large. This strategy is supported by Liouville's theorem, which states that phase-space density remains constant in an adiabatic process. As long as the deceleration is nearly adiabatic, one expects large trapping fractions. Therefore the design problem reduces to finding a solution to Equations 9-13 for $\lambda_w(z)$ and $B_w(z)$ which simultaneously satisfies our two design goals—restricting $\psi_r$ to be between 0 and $\pi/2$ maintaining $A_\Lambda$ large.

The resonant-particle motion is specified by four equations (Equations 10-13), and the bucket area is specified by one additional equation (Equation 9). There are seven unknowns ($\gamma_r$, $\psi_4$, $e_s$, $\psi_s$, $A_\Lambda$, $b_w$, and $\lambda_w$) in these five equations; and in order to specify a design one must have two additional constraints. These constraints are completely arbitary and must be chosen by FEL designer, and this in part determines several embodiments of the invention. In addition, a consistent set of initial conditions must be chosen. A sixth equation may be selected from the following list $$d\lambda_w/dz=0 \text{ (constant wiggler period)}, \quad (15a)$$

$$db_w/dz=0 \text{ (constant magnetic field amplitude)}, \quad (15b)$$

and $$\frac{d(b_w/k_w)}{dz} = 0 \text{ (constant magnetic vector potential)}; \quad (15c)$$

while a seventh equation is chosen to be either $$d\psi_r/dz = \text{(stable phase deceleration)}, \quad (16a)$$

or $$dA_\Lambda/dz = \text{constant or predetermined function of } z \text{ (programmed bucket area deceleration)}. \quad (16b)$$

Option (16b) is practical only when high-current-density electron beams are used. We allow for an initially unbunched beam by replacing $<\sin\psi>$ and $<\cos\psi>$ in equations (12) and (13) with $C<\sin\psi>$ and $C<\cos\psi>$, where we arbitrarily choose $$C = C(z) = 1 - \exp[(\gamma_r(z) - \gamma_r(0))C_\gamma/\Delta\gamma]. \quad (17)$$

Optimizing $C_{65}$ is part of our FEL design.

The function $C(z)$ is initially zero and increases monotonically (to a maximum <1) with increasing z. Multiplication of certain phase space averages such as $<\sin\psi>$ and $<\cos\psi>$ by $C(z)$ qualitatively accounts for the fact that initially the electrons are "unbunched" (uncorrelated and random) and the corresponding phase space averages vanish; but as the longitudinal coordinate z increases the electrons become more bunched and correlated and the phase space averages approach those for perfectly bunched electrons.

Note that this design procedure results in a wiggler carefully matched to the electron energy throughout the FEL amplifier and should be distinguished from designs which arbitrarily select a wiggler taper (e.g., exponential or linear).

We have used the procedure described above to design a high-power, 385-μm, FEL amplifier. We chose $\gamma_r = 15$ (kinetic energy = 7.15 MeV), $\psi_r = 0.4$, $\Delta\gamma = 0.2$, $\lambda_w = 8.7$ cm, $C_\gamma = 1.0$, and $J = 100$ A/cm². The estimated trapped current density is then 41 A/cm², yielding electon beam energy density well above the light beam energy density input. An input laser flux or 0.67 MW/cm² is also required, thereby setting $P_{max} = \Delta\gamma$.

We have also used the procedure described to design a series of 3 mm FEL amplifiers, with $\gamma_r = 4$, 6 and 9; $\Delta\gamma/\gamma = 0.023$ and 0.073; $\lambda_w = 2$, 4.5 and 10 cm; $B_w = 3$, 6.6 and 15 kG; and $J > 50$ amps/cm², using the embodiment $k_w = $ constant and $\psi_r = $ constant. With various electron beam radii from 0.077–0.57 cm. The calculated efficiencies of these systems exceed 40%. Thus, even an electron beam of modest initial energy ($\gtrsim 1.5$ MeV) can be used successfully in FEL design.

Figure 2:
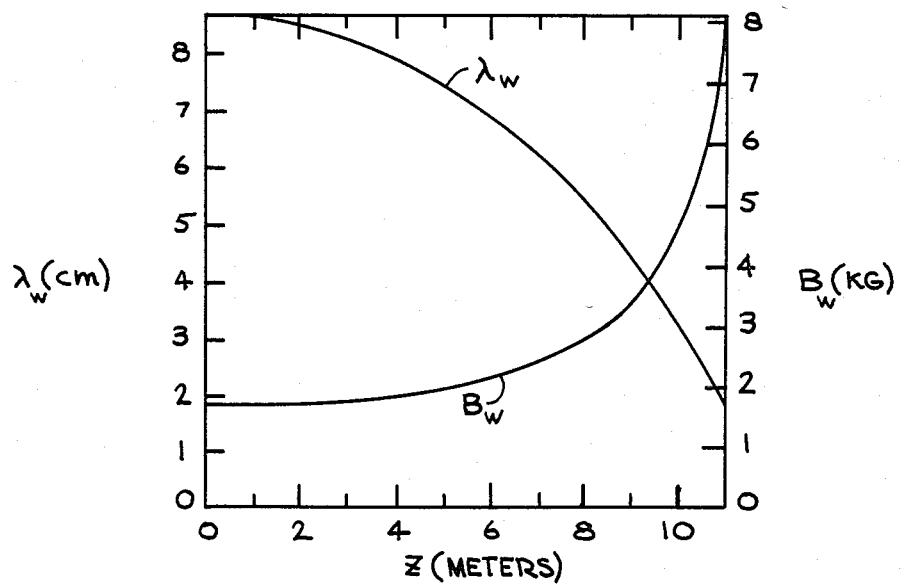
FIG. 2 is a graphic view of wiggler magnetic field strength B (in kiloGauss) and wiggler wavelength $\lambda_w$ (in cm) for a 385 μm amplifier design employing constant $\lambda_w B_w (\propto b_w/k_w)$, and stable phase angle, as a function of propagation distance in the wiggler region.
Figure 3:
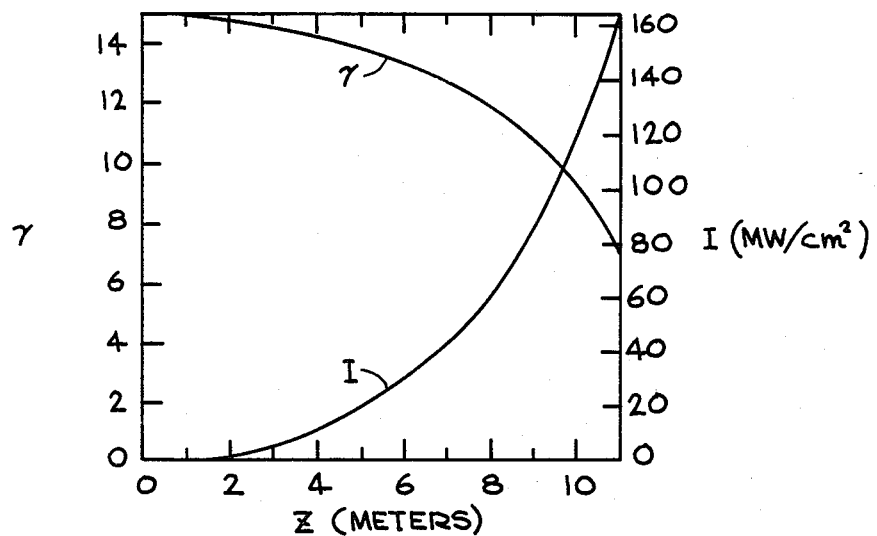
FIG. 3 is a graphic view of the electron beam energy ($\propto \gamma$) and laser field density I for the design of FIG. 2.

The first embodiment of the invention imposes the conditions (15c, 16a); i.e., $\psi_r = $ constant and $b_w/k_w = $ constant. The design resulting from this procedure is illustrated in FIGS. 2 and 3. In 11 meters the magnetic field has increased from 1.7 kG to 8 kG, while the wiggler spacing has decreased from the initial 8.7 cm to 2 cm. The laser field is predicted to reach over 160 MW/cm² at this point, while $\gamma$ has decreased to 7 (no losses were included in this design). These calculations also indicate that the bucket area has increased by a factor of 2 in 11 meters, and therefore our design goals have been met. Our one-dimensional arguments predict that this device will perform well. Unfortunately, a sinusoidal wiggler field requires that there also be a transverse variation of the magnetic field. The transverse field has an effect similar to that of introducing an additional equivalent energy spread of magnitude $$\Delta\gamma_{effective} = \gamma_r \frac{b_w^2 r^2}{4(1 + b_w^2/k_w^2)} \quad (18)$$

into the beam. Upon examining the design for the constant $b_w/k_w$ wiggler we find that the equivalent energy spread (assuming constant r) has increased 10 times while the bucket area has increased 80%. Equation (38) can be reexpressed in terms of the electron beam's emittance as $$\Delta\gamma_{effective} = \gamma_r \frac{(\gamma\epsilon) b_w}{4(1 + b_w^2/k_w^2)}. \quad (19)$$

If we assume that the electron beam's normalized emittance ($\gamma\epsilon$) stays constant (the beam radius shrinks), we find that the equivalent energy spread still increases more than the bucket area and severe detrapping would result. Therefore, although our one-dimensional model would predict good performance for this design, two-dimensional arguments lead us to look for additional options beside constant magnetic vector potential.

Figure 4:
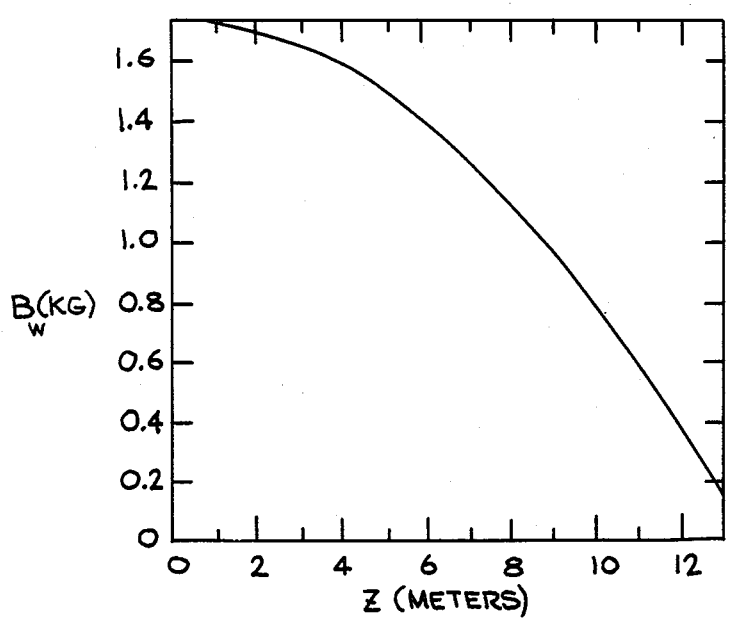
FIG. 4 is a graphic view of wiggler magnetic field strength for a 385 μm amplifier design employing constant wavelength $\lambda_w$ and stable phase angle.
Figure 5:
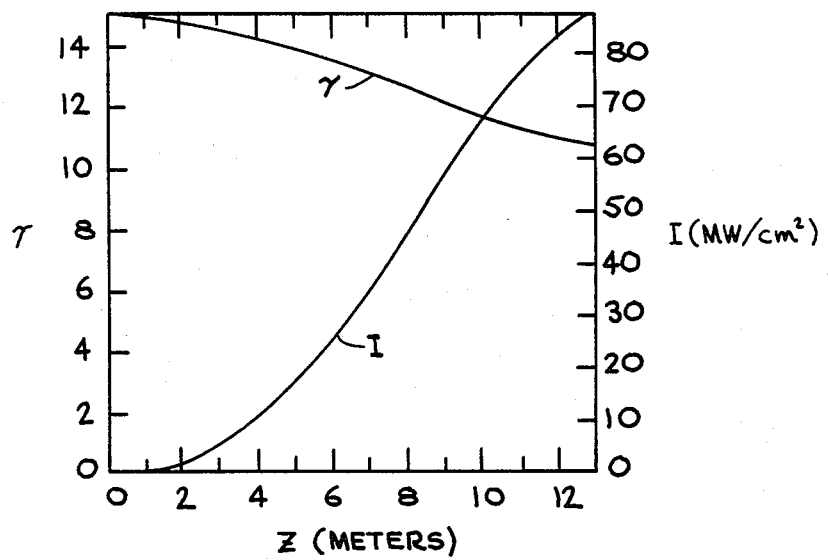
FIG. 5 is a graphic view of the electron beam energy ($\propto \gamma$) and laser field intensity I for the design of FIG. 4.
Figure 6:
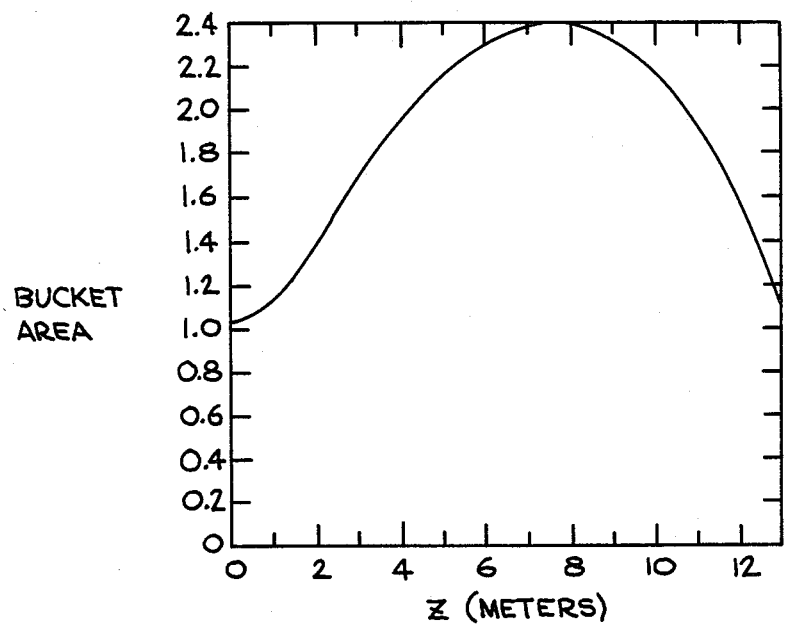
FIG. 6 is a graphic view of the phase space "bucket area" for the design of FIG. 4.

The magnetic field profile and expected laser gain in a constant period 385-μm FEL amplifier are illustrated in FIGS. 4 and 5. The magnetic field decreases from 1.7 kG to 0.17 kG in 13 meters while the laser field grows to 88 MW/cm² and the average electron energy decreases to $\gamma=10.9$. As FIG. 6 shows, the bucket area is greater than or equal to the initial bucket area for 95 percent of the amplifier length while the additional energy spread due to transverse field variations (Equations 17 and 18) has actually decreased. Therefore, an FEL with this design is expected to perform well. Unfortunately, this design only permits one to decelerate the electrons by 30 percent. This problem may be reflected without increasing the effective energy spread by either increasing the initial electron energy, or by allowing $\lambda_w$ to decrease (with constant $b_w$ section, option 15b) only after $b_w$ has been reduced below its initial value.

Figure 7:
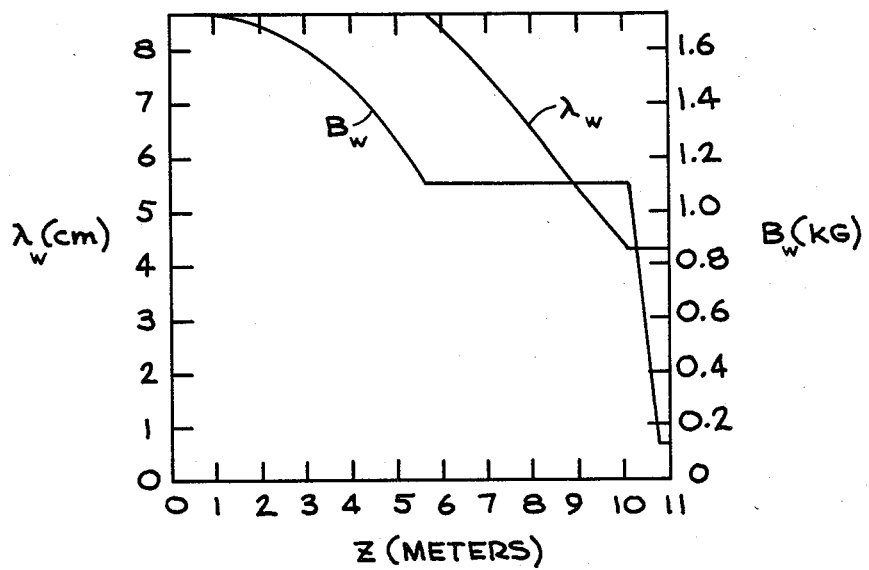
FIG. 7 is a graphic view of the wiggler magnetic field strength $B_w$ and wavelength $\lambda_w$ for a 385 μm amplifier design employing constant wavelength, then constant wiggler strength for a programmed phase space bucket area.
Figure 8:
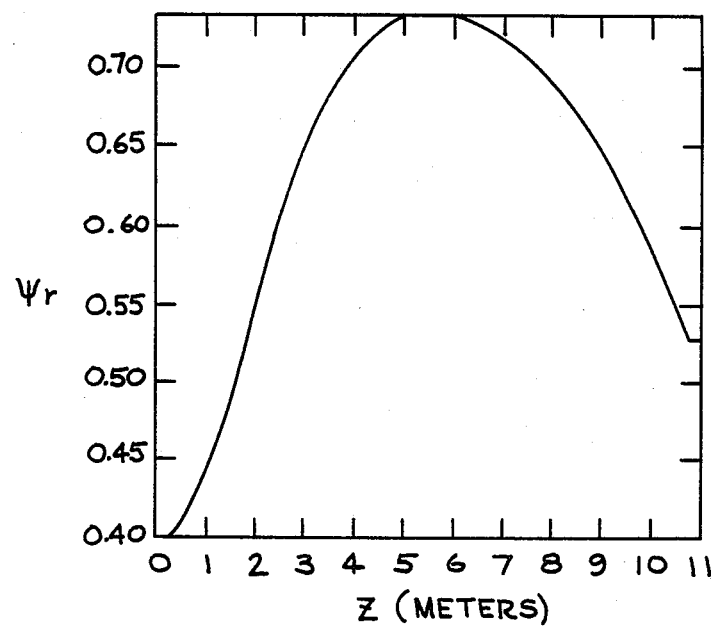
FIG. 8 is a graphic view of the variation of resonant phase angle with distance of beam propagation for the design of FIG. 7.
Figure 9:
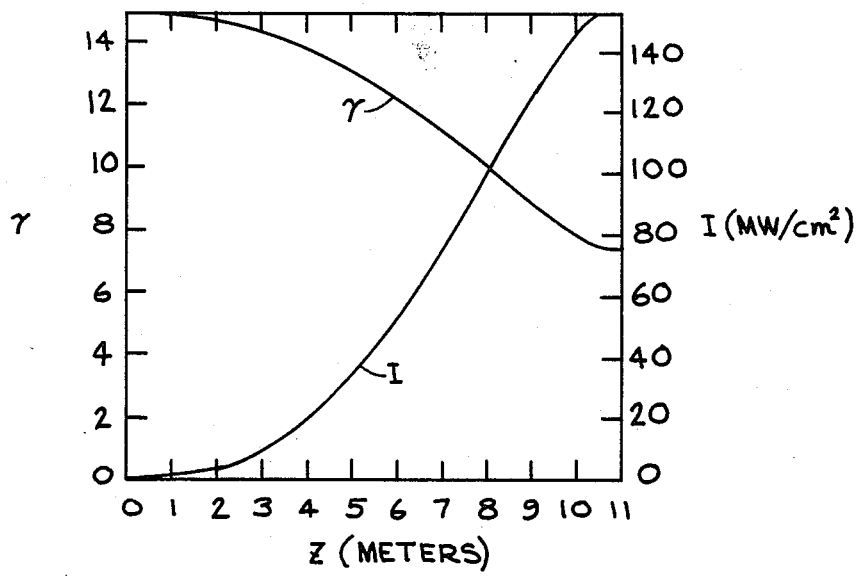
FIG. 9 is a graphic view of the electron energy ($\propto \gamma$) and laser field intensity as a function of distance of beam propagation for the design of FIG. 7.

The FEL design resulting from a variation of this second alternative is illustrated in FIG. 7. We choose an amalgamation of options 15a and 15b, hereinafter called the "alternating constancy" option, wherein $k_w$ (or, equivalently, $\lambda_w$) is maintained constant over substantially 50% of the length (5.5 M of the 11 M length in FIG. 7), then $b_w$ is maintained constant over most of the remainder of the system length, then $k_w$ is maintained constant over the remainder of the length (~the remaining 10% in FIG. 7). The alternating constancy option is combined with option 16b (programmed bucket area change) with $(d/dz)A_\Lambda=0$. This option combination appears to avoid detrapping problems associated with excess transverse magnetic field fluctuations. During the first 5.5 meters, $\lambda_w$ is held constant and $b_w$ decreases from 1.7 KG to 1.1 kG. For the next 4.5 meters, $\lambda_w$ decreases while $b_w$ is held constant. Finally, $\lambda_w$ is held constant while $b_w$ decreases from 1.1 kG to 0.1 kG over the remaining ~10% of the system length. As illustrated in FIG. 8, $\psi_r$ is programmed to change in the precise manner required to keep the bucket area constant. FIG. 9 illustrates this laser's output power as a function of amplifier length. Almost 150 MW/cm² may be obtained in 11 meters, almost as much as in the constant $b_w/k_w$ design but without the added problems of detrapping due to excessive transverse-field fluctuations. An alternative design to options 15, which would eliminate the problem of detrapping due to inhomogeneous transverse magnetic fields, might be obtained by requiring $\Delta\gamma_{effective}$ to remain constant throughout the accelerator. The detrimental effects of electron-beam emittance are similar to those of transverse-magnetic field fluctuations, and therefore designs that avoid the latter problem also prevent the former.

Figure 10:
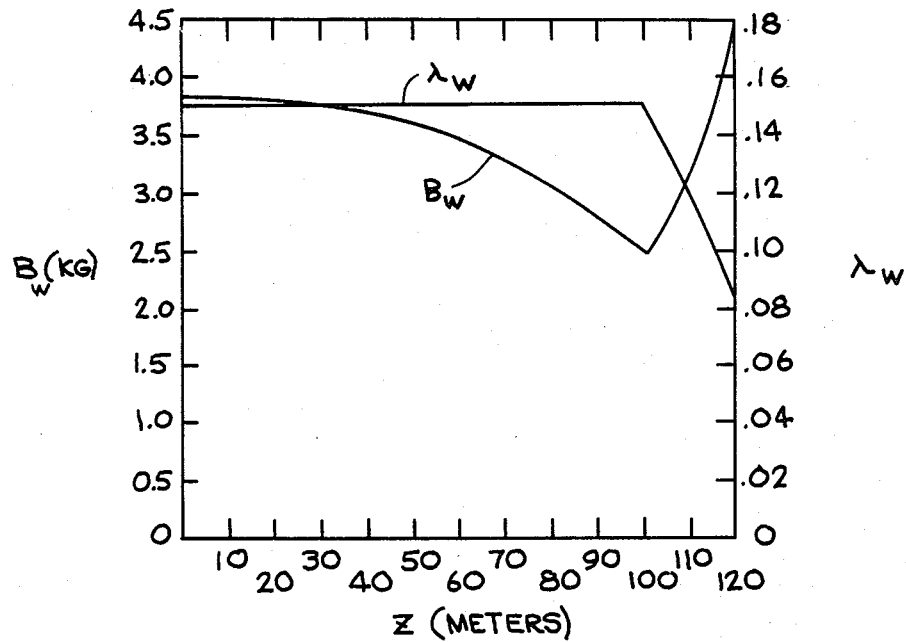
FIGS. 10–12 are graphic views of magnetic field strength ($b_w$) and period ($\lambda_w$), programmed bucket area ($A_{79}$) and the corresponding required resonant phase angle ($\psi_R$), electron energy ($\propto \gamma$) and light beam intensity (I) as a function of distance Z along the wiggler magnet axis, for an FEL designed to amplify a light beam at visible wavelengths, for an option including a programmed bucket area.
Figure 11:
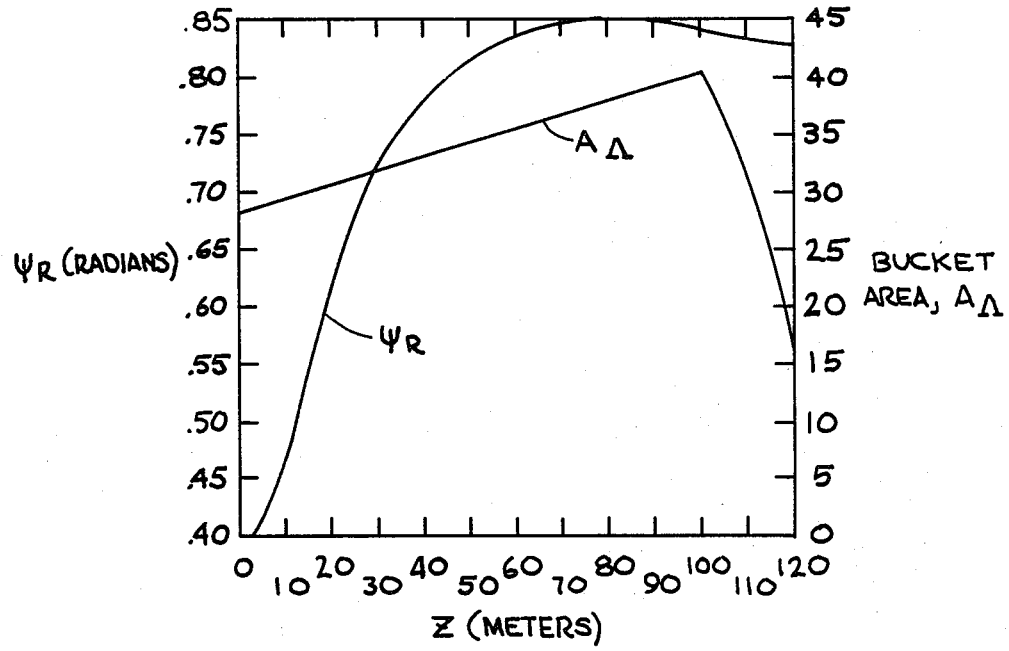
Figure 12:
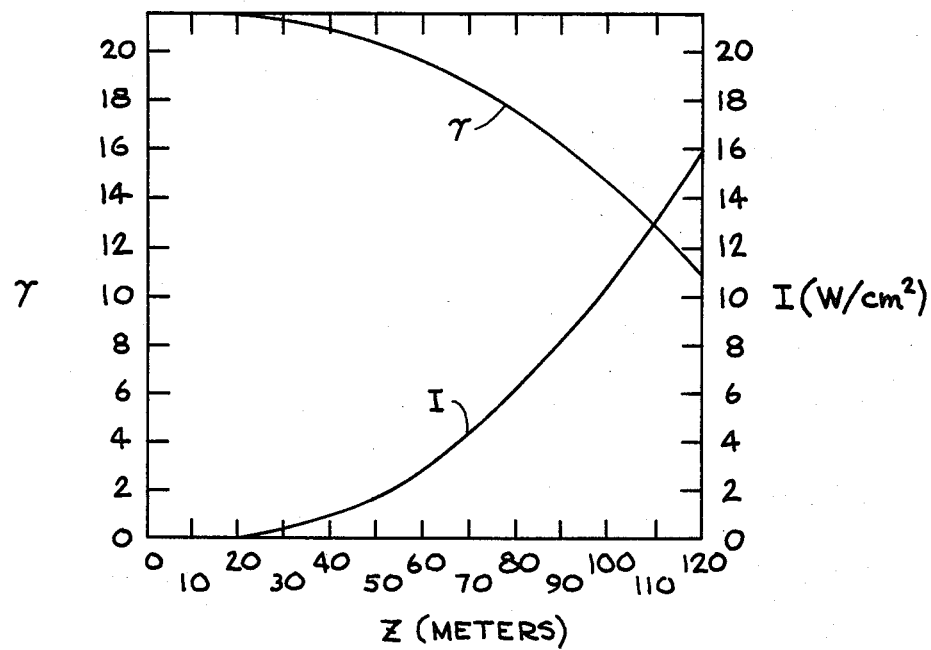

As a final example of an FEL design, we show a 0.25 μm power amplifier design in FIGS. 10-12. The design options used are (15a, 16b) followed by (15c, 16a). The amplifier shows an output of at least $16\times10^{12}$ W/cm² after 120 m, where the wigger fields shown in FIG. 10 are used.

Option 16(b) is applied with the requirement that $$\frac{d}{dz}A_\Lambda = \frac{d}{dz}\left(\frac{4e_s b_w}{k_w^2}\right)^{\frac{1}{2}}$$

$$\int_0^\psi \max[\cos\psi + \cos\psi_r - (\pi - \psi - \psi_r)\sin\psi_r]^{\frac{1}{2}} d\psi$$

= constant,

-continued $$A_\Lambda(z) = A_1 z + A_0.$$

This option, with $A_1=0$, was applied in the earlier designs indicated in FIG. 7. In the design of FIGS. 10-12, $\psi_r$ is varied from 0.4 (radians) initially to 0.85 (FIG. 11) so that bucket area $A_\Lambda$ increases linearly for the first 100 M, after which $A_\Lambda$ is allowed to decrease by the action of other physical constraints. Increase of $A_\Lambda$ with the longitudinal coordinate z enhances the capture efficiency of the bucket, of course, but it may be difficult to continue indefinitely the growth of bucket area. FIG. 12 exhibits the decay of $\gamma$ for the electron beam (50% conversion in 120 M) and the corresponding growth in amplified light beam intensity, I, to $16\times10^{12}$ W/cm² over 120 m. Careful bucket area control, inherent in option 16b, greatly enhance the performance.

Option 15a, 15b or 15c is used to determine the method of construction of the wiggler—either change the wiggler field, the wiggler wavelength or both. Option 16a and 16b are used to determine the method for ensuring phase stability. Constant phase angle is the most straightforward approach (option 16a), but careful control of the bucket size (option 16b) has the advantages of (1) decreasing the amplifier length by increasing the phase angle (and gain) in the early stages of the amplifier and (2) increasing the efficiency of the amplifier by reducing the phase angle and preventing detrapping in later stages of the amplifier. Therefore the modification in the designs resulting from a substitution of the programmed bucket area algorithm for the constant phase angle algorithm improves FEL amplifier performance.

Although the foregoing description of preferred embodiments is presented for purposes of illustration, it is not intended to limit the invention to the forms disclosed; and variation and modification may be made without departing from the scope of the invention.

We claim:

1. A method for amplification of the optical radiation in a light beam of predetermined wavelength $\lambda_s=2\pi/k_s=c/\omega_s$, local electric field strength $E_s$ and normalized electric field strength $e_{s2}=E_s/\sqrt{2}mc^2$, where e is the unit of electron charge and $mc^2$ is electron rest energy, the method comprising the steps of:

providing a transverse wiggler magnetic field of alternating polarity along a predetermined z-axis, the magnetic field having local field strength $B_w$, normalized magnetic field strength $b_w=eB_w/\sqrt{2}mc$ and local period $\pi_w=2\pi/k_w$, where the magnetic field variables $b_w$ and $k_w$ satisfy $b_w/k_w$=constant or $k_w$=constant or the alternating constancy condition throughout the range of interest of the axis coordinate z;

directing a collimated beam of electrons having relativistic energy $\gamma mc^2$ initially exceeding 1.5 MeV along the predetermined axis, with the electron beam power density being greater than the light beam power density;

directing the light beam along the predetermined axis in timed relationship with the passage of the electron beam; and varying the phase angle $$\psi = \int_o^z (k_w + k_s) dz - \omega_s t$$

along the predetermined axis so that the quantity $$-\frac{d}{dz}\left\{\left(\frac{4e_sb_w}{k_w^2}\right)^{\frac{1}{2}}\int_0^\psi \max[\cos\psi + \cos\psi_r - (\pi - \psi - \psi_r)\sin\psi_r]^{\frac{1}{2}} d\psi\right\} = A_1.$$

is substantially constant.

2. A method according to claim 1, wherein said wiggler magnet field initially has a field strength of at least $B_w = 1700$ Gauss and an initial period of substantially $\lambda_w = 8.7$ cm and the light beam wavelength $\lambda_s$ is substantially 385 μm.

3. A method for amplification of the optical radiation in a light beam of predetermined wavelength $\lambda_s = 2\pi/k_s = c/\omega_s$, local field strength $E_s$ and normalized electric field strength $e_s = eE_s/\sqrt{2}mc^2$, where e is the unit of electron charge and $mc^2$ is electron rest energy, the method comprising the steps of:

providing a transverse wiggler magnetic field of alternating polarity along a predetermined z-axis, the magnetic field having local field strength $B_w$, normalized magnetic field strength $b_w = eB_w/\sqrt{2}mc$ and local period $\lambda_w = 2\pi/k_w$, where the magnetic field variables $b_w$ and $k_w$ satisfy $b_w/k_w = $constant or $k_w = $constant or the alternating constancy condition throughout the range of interest of the axis coordinate z;

directing a collimated beam of electrons having relativistic energy $\gamma mc^2$ initially exceeding 1.5 MeV along the predetermined axis, with the electron beam power density being greater than the light beam power density;

directing the light beam along the predetermined axis in timed relationship with the passage of the electron beam; and providing a substantially constant stable phase angle $$\psi = \int_0^z (k_s + k_w) dz - \omega_s t$$

associated with the electon beam so that $\psi$ substantially satisfies the relation $$\frac{d\psi}{dz} = k_w - \frac{k_s}{2\gamma^2}\left[1 + \left(\frac{b_w}{k_w}\right)^2 - \frac{2b_we_s}{k_wk_s}\cos\psi + \left(\frac{e_s}{k_s}\right)^2\right] = 0.$$

4. A method according to claim 3, wherein said wiggler magnet field initially has a field strength of at least $B_w = 1700$ Gauss and an initial period of substantially $\lambda_w = 8.7$ cm and the light beam wavelength $\lambda_s$ is substantially 385 μm.

5. Apparatus for amplification of the optical radiation in a light beam of predetermined wavelength $\lambda_s = 2\pi/k_s$ and local field strength $E_s = \sqrt{2}mc^2 e_s/e$, where e is the unit of electron charge and $mc^2$ is the electron rest energy, the apparatus comprising:

a transverse wiggler magnet having alternating polarity along a predetermined z-axis, the magnetic field having local field strength $B_W = \sqrt{2}mc\, b_w/e$ and local period $\lambda_w = 2\pi/k_w$, with the magnetic field variables $b_w$ and $k_w$ being chosen to satisfy the condition $b_w/k_w = $constant or $k_w = $constant or the alternating constancy condition throughout the range of interest of the axis coordinate z;

a collimated beam of electrons having relativistic energy $\gamma mc^2$ initially exceeding 1.5 MeV, and having a power density greater than the power density of the light beam, the electron beam being directed along the predetermined z-axis in timed relationship with the passage of the light beam along the same axis; and with the magnetic field variable $b_w$ and $k_w$ being further varied so that the beam phase angle $$\psi = \int_0^z (k_w + k_s) dz - \omega_s t$$

$$-\frac{d}{dz}\left\{\left(\frac{4e_sb_w}{k_w^2}\right)^{\frac{1}{2}}\int_0^\psi \max[\cos\psi + \cos\psi_r - (\pi - \psi - \psi_r)\sin\psi_r]^{\frac{1}{2}} d\psi\right\} = A_1 \text{ (constant)}.$$

6. Apparatus for amplification of the optical radiation in a light beam of predetermined wavelength $\lambda_s = 2\pi/k_s$ and local field strength $E_s = \sqrt{2}mc^2e_s/e$, where e is the unit of electron charge and $mc^2$ is the electron rest energy, the apparatus comprising:

a transverse wiggler magnet having alternating polarity along a predetermined z-axis, the magnetic field having local field strength $B_w = \sqrt{2}mc\, b_w/e$ and local period $\lambda_w = 2\pi/k_w$, with the magnetic field variables $b_w$ and $k_w$ being chosen to satisfy the condition $b_w/k_w = $constant or $k_w = $constant or the alternating constancy condition throughout the range of interest of the axis coordinate z;

a collimated beam of electrons having relativistic energy $\gamma mc^2$ initially exceeding 1.5 Mev, and having a power density greater than the power density of the light beam, the electron beam being directed along the predetermined z-axis in timed relationship with the passage of the light beam along the same axis; and with the magnetic field variable $b_w$ and $k_w$ being further varied so that the beam phase angle $$\psi = \int_0^z (k_w + k_s) dz - \omega_s t$$

$$\frac{d\psi}{dz} = k_w - \frac{k_s}{2\gamma^2}\left[1 + \left(\frac{b_w}{k_w}\right)^2 - \frac{2b_we_s}{k_wk_s}\cos\psi + \left(\frac{e_s}{k_s}\right)^2\right] = 0.$$

* * * * *